(12) United States Patent
Nakazawa et al.

(10) Patent No.: US 11,265,264 B2
(45) Date of Patent: Mar. 1, 2022

(54) SYSTEMS AND METHODS FOR CONTROLLING PROCESS PRIORITY FOR EFFICIENT RESOURCE ALLOCATION

(71) Applicant: INTERNATIONAL BUSINESS MACHINES CORPORATION, Armonk, NY (US)

(72) Inventors: Rina Nakazawa, Tokyo (JP); Kazunori Ogata, Soka (JP); Seetharami R. Seelam, Chappaqua, NY (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 16/554,716

(22) Filed: Aug. 29, 2019

(65) Prior Publication Data

US 2019/0386929 A1  Dec. 19, 2019

Related U.S. Application Data

(63) Continuation of application No. 15/295,470, filed on Oct. 17, 2016, now abandoned.

(51) Int. Cl.
*H04L 12/00* (2006.01)
*H04L 47/70* (2022.01)
*H04L 43/0888* (2022.01)
*G06F 9/50* (2006.01)
*H04L 41/0896* (2022.01)

(52) U.S. Cl.
CPC .......... *H04L 47/821* (2013.01); *G06F 9/5061* (2013.01); *G06F 9/5083* (2013.01); *H04L 41/0896* (2013.01); *H04L 43/0888* (2013.01); *H04L 47/822* (2013.01)

(58) Field of Classification Search
CPC .. G06F 9/5083; G06F 9/5061; H04L 43/0888; H04L 47/822; H04L 47/821; H04L 41/0896
USPC .................................................. 709/224, 225
See application file for complete search history.

(56) References Cited

U.S. PATENT DOCUMENTS

| | | | | |
|---|---|---|---|---|
| 5,675,739 A * | 10/1997 | Eilert | ..................... | G06F 9/5083 709/226 |
| 6,338,046 B1 * | 1/2002 | Saari | .................. | G06Q 30/0283 379/115.01 |
| 6,341,303 B1 * | 1/2002 | Rhee | ..................... | G06F 9/4881 710/240 |

(Continued)

OTHER PUBLICATIONS

List of IBM Patents or Patent Applications Treated as Related dated Aug. 29, 2019, 2 pages.

(Continued)

*Primary Examiner* — Frantz Coby
(74) *Attorney, Agent, or Firm* — Tutunjian & Bitetto, P.C.; Randall Bluestone

(57) ABSTRACT

Methods and systems for controlling process priority for one or more work units having one or more processes. The method includes monitoring a combination of a throughput value and a response time value for each work unit, detecting a change in load level for each work unit based on a correlation between the throughput value and the response time value to adjust a priority level associated with the work unit, and reallocating one or more resources to the work unit when the priority level exceeds a predetermined threshold value.

20 Claims, 6 Drawing Sheets

(56) References Cited

U.S. PATENT DOCUMENTS

| | | | | |
|---|---|---|---|---|
| 6,584,488 B1* | 6/2003 | Brenner | ................ | G06F 9/5011 718/103 |
| 7,093,250 B1* | 8/2006 | Rector | ................ | G06F 9/4881 718/100 |
| 7,140,020 B2* | 11/2006 | McCarthy | ............ | G06F 9/5061 718/104 |
| 7,644,162 B1* | 1/2010 | Zhu | ........................ | H04L 43/08 709/226 |
| 8,904,008 B2 | 12/2014 | Calder et al. | | |
| 8,918,787 B2* | 12/2014 | Ostojic | ................ | G06F 9/4881 718/103 |
| 9,003,037 B2 | 4/2015 | Beveridge | | |
| 9,864,631 B1* | 1/2018 | Matousek | ............. | G06F 9/5061 |
| 2003/0061260 A1* | 3/2003 | Rajkumar | ............. | G06F 9/4887 718/104 |
| 2003/0065703 A1* | 4/2003 | Aborn | ................ | H04L 67/1012 718/105 |
| 2008/0126547 A1 | 5/2008 | Waldspurger | | |
| 2010/0146512 A1* | 6/2010 | Chen | ...................... | G06F 13/362 718/103 |
| 2010/0251370 A1* | 9/2010 | Sun | ........................ | G06F 21/554 726/23 |
| 2011/0261831 A1* | 10/2011 | Sharma | ................ | H04L 49/205 370/412 |
| 2013/0024867 A1* | 1/2013 | Glew | ........................ | G06F 9/50 718/104 |
| 2013/0155077 A1* | 6/2013 | Hartog | ................. | G06F 9/3851 345/506 |
| 2014/0331234 A1 | 11/2014 | Gibson et al. | | |
| 2016/0269944 A1* | 9/2016 | Li | ........................ | H04W 48/18 |

OTHER PUBLICATIONS

Mell, Peter, et al., "The NIST Definition of Cloud Computing," 2011, 7 pages.

* cited by examiner

SYSTEMS AND METHODS FOR CONTROLLING PROCESS PRIORITY FOR EFFICIENT RESOURCE ALLOCATION

BACKGROUND

Technical Field

The present invention relates to system management and, more particularly, to systems and methods for controlling process priority for efficient resource control.

Description of the Related Art

Overcommit generally refers to the practice of distributing virtual memory (e.g., address space) with no guarantee that physical storage exists, such as memory in a machine. For example, memory overcommitment is the assignment of more memory to virtual computing devices, such as virtual machines (VMs), than the capacity of the physical machine they are hosted on. Resource overcommitment is a key factor for high density and better efficiency of cloud data centers, and such overcommitment can improve server efficiency. However, a high overcommit ratio can cause thrashing, such as employing a repetitive swapping condition, which may ultimately degrade system performance.

SUMMARY

In accordance with an embodiment of the present invention, a method is provided for controlling process priority for one or more work units having one or more processes. The method includes monitoring a combination of a throughput value and a response time value for each work unit, detecting a change in load level for each work unit based on a correlation between the throughput value and the response time value to adjust a priority level associated with the work unit, and reallocating one or more resources to the work unit when the priority level exceeds a predetermined threshold value.

In accordance with an embodiment of the present invention, a non-transitory computer readable storage medium is provided. The non-transitory computer readable storage medium includes a computer readable program for controlling process priority for one or more work units having one or more processes. The computer readable program when executed on a computer causes the computer to perform a method. The method includes monitoring a combination of a throughput value and a response time value for each work unit, detecting a change in load level for each work unit based on a correlation between the throughput value and the response time value to adjust a priority level associated with the work unit, and reallocating one or more resources to the work unit when the priority level exceeds a predetermined threshold value.

In accordance with an embodiment of the present invention, a system is provided. The system includes a memory and a hardware processor configured to monitor a combination of a throughput value and a response time value for each work unit from one or more work units, the one or more work units having one or more processes, detect a change in load level for each work unit based on a correlation between the throughput value and the response time value to adjust a priority level associated with the work unit, and reallocate one or more resources to the work unit when the priority level exceeds a predetermined threshold value.

These and other features and advantages will become apparent from the following detailed description of illustrative embodiments thereof, which is to be read in connection with the accompanying drawings.

BRIEF DESCRIPTION OF THE DRAWINGS

The following description will provide details of preferred embodiments with reference to the following figures wherein.

DETAILED DESCRIPTION

Figure 1:
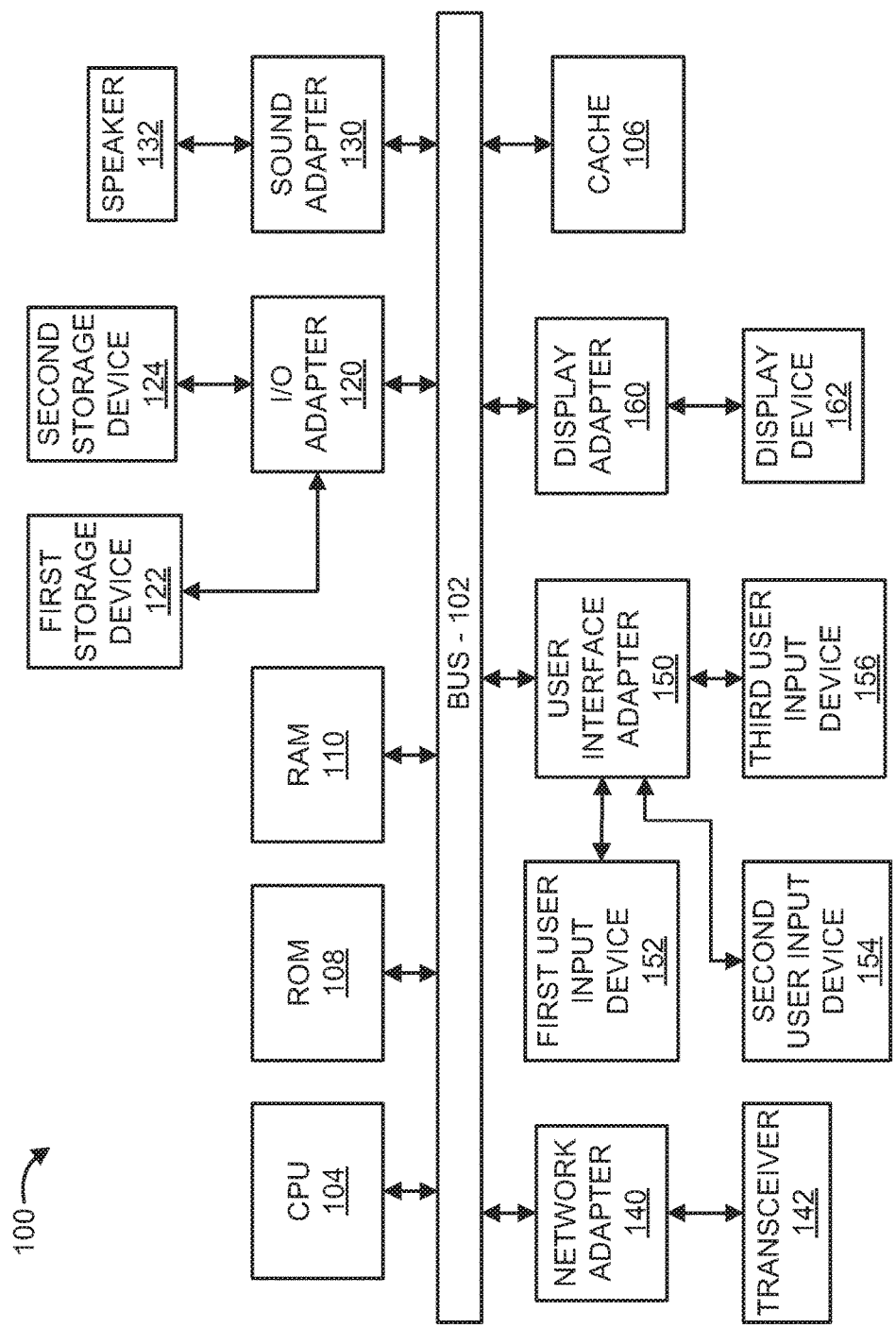
FIG. 1 is a block/flow diagram showing an exemplary processing system/method in accordance with an embodiment of the present invention.

Systems and methods for controlling process priority for efficient resource control in a cloud data center environment is provided. Cloud data centers run workloads having various activity levels. Accordingly, proper allocation of sufficient resources to those workloads that produce larger throughout is important for server performance. In some embodiments, systems and methods are provided that monitor throughput and response time for one or more work units (e.g., workloads), which may be a container, and prioritize each work unit based on a correlation between the throughput and the response time. Accordingly, the present invention provides mechanisms to prioritize work units when a system resource is fully overcommitted and/or prevent swapping of system resources that are overcommitted to avoid degradation of performance of each work unit due to setting an incorrect priority and/or to avoid unnecessary memory usage.

Container technology may be described as low overhead virtualization technology. A container provides a virtualized environment to one or more processes. Such container technology is similar to a virtual machine from the viewpoint of a user process, insofar as a container may provide its own name spaces, such as file paths, user names, and/or process identifications. The difference between a container and a virtual machine, from the viewpoint of the operating system(s) (OS), is whether or not the OS is running in the virtualized environment. A virtual machine may provide a virtualized environment to the OS (e.g., a guest OS) running within it, with the guest OS independent from the OS that runs the virtual machine. For a container, the OS within the container may be shared with the OS that provides the container, and each container only runs user processes.

In some embodiments, each work unit (e.g., workload) is run in a separate container such that changing priority of a container results in changing the priority of the work unit contained within in it. A container is one implementation of a work unit. It should be noted that a container is a unit of virtualized environment, while a workload is a unit of one or more processes that performs tasks. In some embodiments, a work unit is a container having at least one application, the at least one application including at least one process and/or a plurality of processes. In some embodiments, the work unit is a virtual machine, the virtual machine including at least one process and/or a plurality of processes.

The present invention may be a system, a method and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Referring to the drawings in which like numerals represent the same or similar elements and initially to FIG. 1, an exemplary processing system 100 to which the present invention may be applied is illustratively depicted, in accordance with an embodiment. The processing system 100 includes at least one processor (CPU) 104 operatively coupled to other components via a system bus 102. A cache 106, a Read Only Memory (ROM) 108, a Random Access Memory (RAM) 110, an input/output (I/O) adapter 120, a sound adapter 130, a network adapter 140, a user interface adapter 150, and a display adapter 160, are operatively coupled to the system bus 102.

A first storage device 122 and a second storage device 124 are operatively coupled to system bus 102 by the I/O adapter 120. The storage devices 122 and 124 can be any of a disk storage device (e.g., a magnetic or optical disk storage device), a solid state magnetic device, and so forth. The storage devices 122 and 124 can be the same type of storage device or different types of storage devices.

A speaker 132 is operatively coupled to system bus 102 by the sound adapter 130. A transceiver 142 is operatively coupled to system bus 102 by network adapter 140. A display device 162 is operatively coupled to system bus 102 by display adapter 160.

A first user input device 152, a second user input device 154, and a third user input device 156 are operatively coupled to system bus 102 by user interface adapter 150. The user input devices 152, 154, and 156 can be any of a keyboard, a mouse, a keypad, an image capture device, a motion sensing device, a microphone, a device incorporating the functionality of at least two of the preceding devices, and so forth. Other types of input devices can also be used. The user input devices 152, 154, and 156 can be the same type of user input device or different types of user input devices. The user input devices 152, 154, and 156 are used to input and output information to and from system 100.

Of course, the processing system 100 may also include other elements (not shown). For example, various other input devices and/or output devices can be included in processing system 100, depending upon the particular implementation of the same. For example, various types of wireless and/or wired input and/or output devices can be used. Moreover, additional processors, controllers, memories, and so forth, in various configurations can also be utilized.

Figure 2:
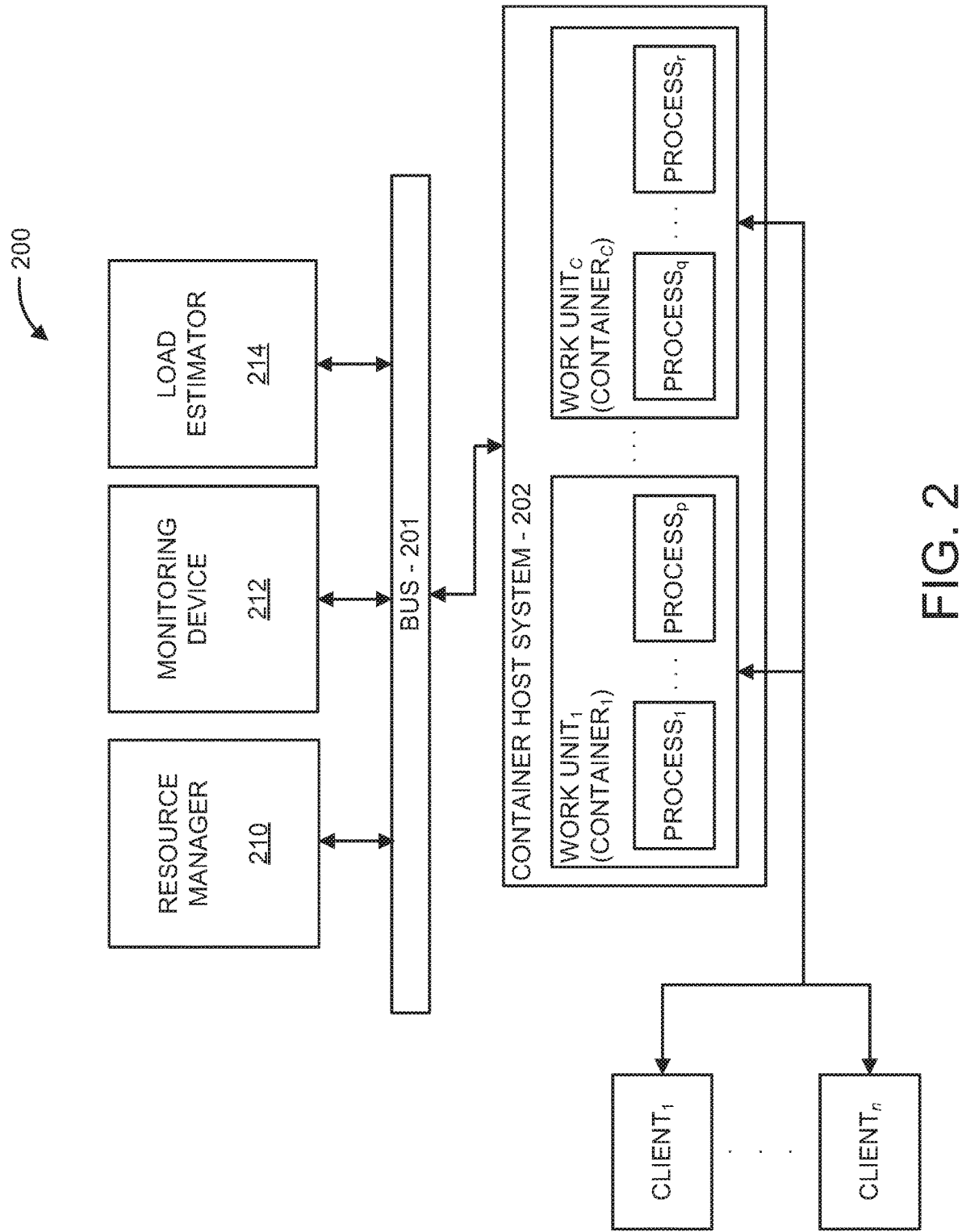
FIG. 2 is a block/flow diagram showing an exemplary system/method for controlling process priority in accordance with an embodiment of the present invention.

Moreover, it is to be appreciated that system 200 described below with respect to FIG. 2 is a system for implementing respective embodiments of the present invention. Part or all of processing system 100 may be implemented in one or more of the elements of system 200.

Figure 3:
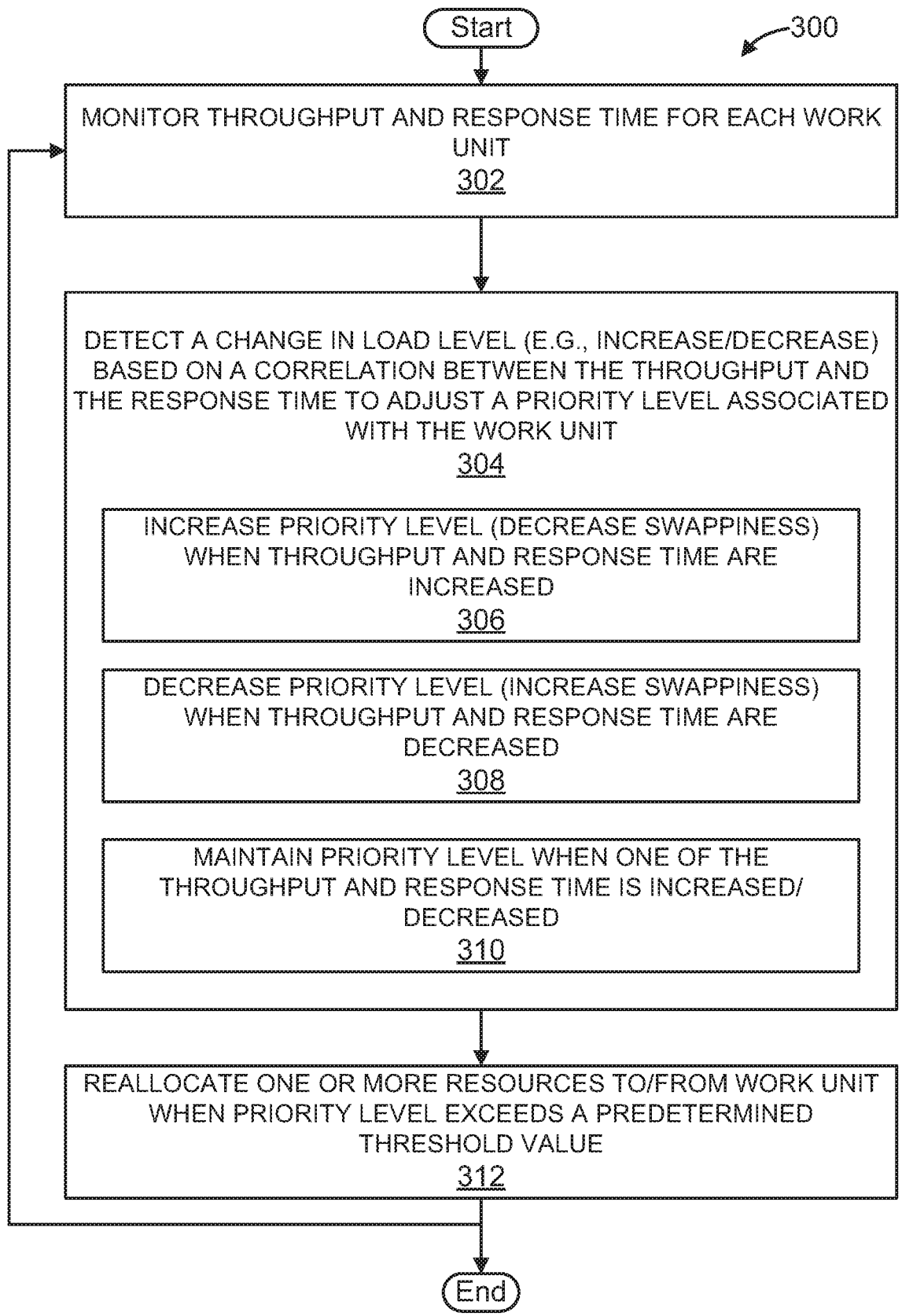
FIG. 3 is a block/flow diagram showing a system/method for controlling process priority in accordance with an embodiment of the present invention.

Further, it is to be appreciated that processing system 100 may perform at least part of the method described herein including, for example, at least part of method 300 of FIG. 3. Similarly, part or all of system 200 may be used to perform at least part of method 300 of FIG. 3.

FIG. 2 shows an exemplary system 200 for controlling process priority for one or more work units having one or more processes. In some embodiments, a cloud data center, such as a container host system 202, can run various work units 1-C (e.g., container$_1$ . . . container$_C$) having various activity levels. Each work unit includes one or more processes, such as process$_1$, process$_p$, process$_q$, and/or process$_r$. To increase server performance, proper allocation of resources to the work units is important, especially work units experiencing and/or producing larger throughput.

The system 200 includes a resource manager 210 configured to control allocation of resources, and may dynamically reallocate resources, such as memory, and/or create address space depending on system processes. For example, the resource manager 210 can employ a kernel, which is a computer operating system kernel that controls system processes, such as execution of programs, and connects application software to hardware on a computer. Often multiple programs will want access to memory, frequently demanding more memory than the computer has available. The resource manager 210 determines which memory each process and/or work unit may use, and determines what to do when not enough memory is available.

In some embodiments, the resource manager 210 includes a kernel parameter that indicates how eagerly a work unit may be swapped out by controlling a weighted value (e.g., a value between 0 and 100) given to swapping out runtime memory. In some embodiments, a low value causes the kernel to avoid swapping, while a higher value causes the kernel to try to use swap space. However, it is important to note that setting the weighted value to 100 may affect the overall performance, while setting it lower, such as zero, may decrease response latency. In addition, a highly active process may not need large memory, while a less active process may run slowly because it is hampered by insufficient memory. According to one embodiment, the resource manager 210 prioritizes containers (e.g., container$_1$ . . . container$_C$) and/or work units based on a correlation between a throughput value (e.g., an amount of performance increase/decrease) and a response time value, as will be described in further detail below.

The system 200 includes a monitoring device 212 configured to monitor a combination of one or more throughput values and a response time value for each work unit to automatically control priorities of resource allocation. In some embodiments, the combination of the throughput values and response time values are monitored periodically such that the monitoring device 212 monitors a plurality of throughput values and response time values. In some embodiments, the throughput and/or response time are monitored using a load balancer and/or a proxy of Hypertext Transfer Protocol (HTTP) connections. In an embodiment, the throughput value is indicative of a rate of production and/or a rate at which something may be processed, such as message delivery over a communication channel (e.g., a network).

Throughput is defined as a function of a number of users (e.g., clients$_1$ ... clients$_n$) and an amount of time spent in various places in a path to process an operation. For example, the throughput value is defined as a function of the response time value as follows:

$$\text{Throughput} = Users_n * \frac{1}{(\text{Response time} + \text{Request interval})},$$

where the request interval is an amount of time spent in the client between when it receives a response from a request and when it sends a subsequent request. A highly active automated client may send the subsequent request just after receiving the response of the previous request, thereby having a request interval of zero. For example, an interactive user may spend ten (10) seconds to send the subsequent request because the user may examine the first response and determine the subsequent request. The request interval parameterizes such characteristics of the clients, since the request interval defines the load level of the work units if the work units are the same ones.

The response time value is further defined as:

$$\text{Response time} = T_{job} + T_{cpuw} + T_{iow}.$$

where $T_{job}$ is an amount of time to process a particular job, $T_{cpuw}$ is an amount of idle time waiting for central processing unit (CPU) time, such as Garbage Collection (GC) overhead, and $T_{iow}$ is an amount of idle time waiting for data from Input/Output (I/O) devices, such as a disk, network, etc. Accordingly, the throughput value is redefined as:

$$\text{Throughput} = \frac{Users_n}{((T_{job} + T_{cpuw} + T_{iow}) + \text{Request interval})}.$$

In an embodiment, the monitoring device 212 monitors throughput values and response times for each work unit and distinguishes the causes of performance drop. For example, the amount of access to a work unit and/or container may decrease such that the container is less active. The amount of access (e.g., during a particular period) is the frequency of requests, such that when the amount of the access decreases the request interval increases. In another example, the amount of access to a work unit and/or container may not decrease, however the throughput may decrease, such as when Garbage Collection (GC) occurs when running a Java application in a container, or when a host limits CPU usage for a container. The system and/or OS running containers may set upper bounds of CPU usage that each container is permitted to use, assuming that the upper limit of a container's CPU usage is decreased and the throughput value is degraded, even though nothing was changed on the client side.

The system 200 includes a load estimator 214 configured to estimate a load level for prioritizing work units based on the correlation between the amount of performance increase/decrease (e.g., throughput value) and the response time. For example, containers may be prioritized when a system resource is almost fully overcommitted. In addition, swapping out of system resources may be prevented under overcommitment, since incorrect and/or unnecessary swapping parameters may cause performance degradation which is difficult to recover from.

In some embodiments, the throughput value and/or response time value is indicative of the load level experienced by the data center. The load level value is defined as a function of parameters that depends on client activities, such as the throughput and the response time. In some embodiments, the load level is increased when the number of Users n has increased and/or the request interval value has decreased. For example, the load level increases when both the throughput value and response time value are increased, while the load level decreases when both the throughput value and response time value are decreased.

The load estimator 214 estimates the load level to adjust a priority level for each work unit. In an embodiment, the priority level is increased for a work unit whose throughput and response time is increasing. In an embodiment, the load estimator 214 decreases the priority level for a work unit whose throughput and response time is decreasing. In another embodiment, the load estimator 214 maintains the priority level for a work unit whose throughput is increasing while the response time is decreasing, and/or a work unit whose throughput is decreasing while the response time is increasing.

In an embodiment, the priority level is indicative of the eagerness of the work unit to be swapped out (e.g., swappiness). In the case of Linux, a swappiness value of 60 equates to the normal (or default) priority level. Any value lower than 60 means the priority is higher than the normal, and the smaller the value is, the higher the priority is. The smallest value is 0 which equates to the highest priority level. The largest value is 100 which equates to the lowest priority level. The priority level and the swappiness of a work unit is inversely related. For example, when the priority level for a work unit has increased, the ability to swap out resources for the work unit decreases such that the kernel avoids swapping memory. In another example, when the priority level for a work unit has decreased, the ability to swap out resources for the work unit increases such that the kernel performs swapping of memory. When the priority level remains unchanged, the swappiness remains unchanged. Accordingly, the ability to "swap out" and/or reallocate resources depends on the priority level, and thus the throughput and response time, for each work unit. Several illustrations of various scenarios are presented below for exemplary purposes.

Scenario #1—Increased Throughput, Increased Response Time:

For example, the load estimator 214 estimates an increased load level when both the throughput and the response time has increased. Load level is the total demand of the clients connecting to a server (or a work unit). The load level may not be tied to any specific measurable values. In some embodiments, the load level is a potential amount of requests clients wish to send. The actual value of the load level depends on the work units. If there is no bottleneck in the server, the load level will be the same as the throughput at the time. However, since real systems encounter some bottlenecks, an exact value of the load level may not necessarily be calculated. Instead, the present invention estimates if the load level should be higher, lower, or comparable to the current throughput, and adjusts priority of the server based on such estimation.

Accordingly, an increased load increases the priority level for such a work unit, thereby decreasing the ability to swap out that particular work unit. In some embodiments, the priority level increases when the time to process a job ($T_{job}$) has increased, thereby decreasing swappiness. However, even when $T_{job}$ is not increased, there is no reason to prevent swappiness from being decreased because the load level may be increased. Conclusion: When the priority level for a work unit has increased, the load estimator 214 decreases the ability of the work unit to be swapped out (e.g., decrease swappiness of memory).

Scenario #2—Decreased Throughput, Increased Response Time:

For example, the load level may not necessarily decrease because longer response time inherently decreases throughput. A work unit having decreased throughput and increased response time may not necessarily have an increased load level. Accordingly, the priority level, and thus the swappiness for the work unit, is maintained so as to keep the system stable and avoid performance degradation by incorrectly adjusting swappiness. Even assuming, for example, the time to process a job $T_{job}$ has not increased, the priority, and thus the swappiness, is kept unchanged since the increased response time may be caused by increased idle time waiting for CPU slices $T_{cpuw}$ and/or increased idle time waiting from data from I/O devices $T_{low}$. In another example, even assuming the time to process a job $T_{job}$ has increased, the priority, and thus the swappiness, is kept unchanged since it may not be clear if the total system performance is increased by decreasing swappiness.

Scenario #3—Increased Throughput, Decreased Response Time:

For example, the load level may not be necessarily decrease because shorter response time inherently increases throughput. Response time and throughput have an inherently inverse relationship. For example, response time becomes longer if requests from clients require complex operations on the server. In this case, throughput is decreased even if nothing else was changed. If both response time and throughput are increased, on the other hand, there may be something else that is causing the increase of response time or throughput. For example, when the number of clients is increased, throughput will be increased (unless the server is not saturated), and response time will also be increased because the CPU usage per client will be decreased, and the total operation will take a longer time to finish.

A work unit having increased throughput and decreased response time may not necessarily have an increased load level. Accordingly, the priority level, and thus the swappiness, for the work unit is maintained so as to avoid memory waste by incorrectly adjusting swappiness. Even assuming, for example, the time to process a job $T_{job}$ has increased, the priority, and thus the swappiness, is kept unchanged since the work unit is experiencing decreased response time.

Scenario #4—Decreased Throughput, Decreased Response Time:

For example, the load estimator 214 estimates a decreased load level when both the throughput and the response time are decreased. Accordingly, the priority level for such a work unit is decreased, thereby increasing the ability to swap out the work unit and/or memory allocated to the work unit. In some embodiments, the priority level is decreased, thereby increasing swappiness, when the time to process a job $T_{job}$ has not increased because the system may handle the job efficiently. However, when $T_{job}$ has increased but the response time has decreased, swappiness may be increased because the load level has decreased and $T_{job}$ may not be a major factor. Conclusion: When the priority level for a work unit has decreased, the load estimator 214 increases the ability of the work unit to be swapped out (e.g., increase swappiness of memory).

In an embodiment, the resource manager 210 controls and/or adjusts allocation of resources when the priority level exceeds a predetermined threshold value. For example, the load level and the priority level are directly related such that an increase in load level is indicative of an increase in priority level, and a decrease in load level is indicative of a decrease in priority level. In some embodiments, the resource manager 210 adjusts and/or reallocates a number of cloud containers and/or virtual machines (VMs) to a workload. In an embodiment, a process and/or system resource is swapped out (e.g., process memory). For example, the resource manager 210 determines which memory each process may use, and/or determine what to do when not enough memory is available, such as execution and/or termination of one or more processes. In addition, the resource manager 210 may save the memory of workloads if the workloads can run without thrashing while they are being swapped out. For example, if some of the workloads can run without thrashing even when they are being swapped out, the system may afford the memory to allow one or more additional workloads to run.

In the embodiment shown in FIG. 2, the elements thereof are interconnected by a bus 201. However, in other embodiments, other types of connections can also be used. Moreover, in an embodiment, at least one of the elements of system 200 is processor-based. Further, while one or more elements may be shown as separate elements, in other embodiments these elements can be combined as one element. These and other variations of the elements of system 200 are readily contemplated.

Accordingly, the system 200 effectively avoids misjudging activity level of containers because it may take additional time to readjust resource priority. The present invention provides at least one of the following advantages, namely, prevents degradation of performance due to setting wrong priority and/or prevents unnecessary memory use. For example, the present invention prevents degradation of performance by appropriately prioritizing each container, keeping the throughput of high-loaded workloads high, and reducing the amount of resources allocated to idle and/or lightly-loaded workloads. Monitoring only throughput may lead to incorrect prioritization, since a host (e.g., cloud data center) cannot distinguish between a container having an decreased amount of access and when CPU usage is limited. In addition, the present invention prevents unnecessary memory use by unnecessarily setting low swappiness. Setting unnecessary low swappiness causes memory waste because the workload works efficiently without setting lower swappiness, thereby causing other workloads to be swapped out. The present invention avoids such memory waste by monitoring both throughput and response time for each container.

Now referring to FIG. 3, an exemplary method 300 for controlling process priority is illustratively depicted, in accordance with an embodiment of the present invention.

Block 302 begins by monitoring a throughput value and a response time value for each work unit. Block 304 determines whether a load level increase or a load level decrease for each work unit has been detected based on a correlation between the throughput value and the response time value so as to adjust a priority level associated with the work unit. In an embodiment, the throughput value is based on a number of users accessing the container and/or work unit, the response time value, and/or a request interval. In an embodiment, the response time value includes an amount of time to process a job, an amount of idle time waiting for CPU time slices, and/or an amount of idle time waiting for data from one or more input/output devices.

In block 306, the method 300 includes increasing the priority level associated with the work unit when the throughput value and the response time value are increased such that swappiness (e.g., swappiness of memory to/from work unit) is decreased. Alternatively, the method 300 includes decreasing the priority level associated with the work unit when the throughput value and the response time value are decreased such that swappiness (e.g., swappiness of memory to/from work unit) is increased, as shown in block 308. In an embodiment, the method 300 includes maintaining the priority level associated with the work unit when one of the throughput value and the response time value is increased, or when one of the throughput value and the response time value is decreased, as shown in block 310. In block 312, the method 300 includes reallocating one or more resources when the priority level exceeds a predetermined threshold value, such as reallocating one or more virtual machines to a workload and/or reallocating memory to the work unit. For example, the threshold of the throughput value may be 30% of the previous average value, and the threshold of the response time may be 2-3 times the previous average response time value. When the throughput value and the response time value become more than their threshold values, the swappiness is decreased.

It should be understood that the blocks of 302-312 may be continuously repeated or may discontinue when controlling process priority is no longer needed.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Figure 4:
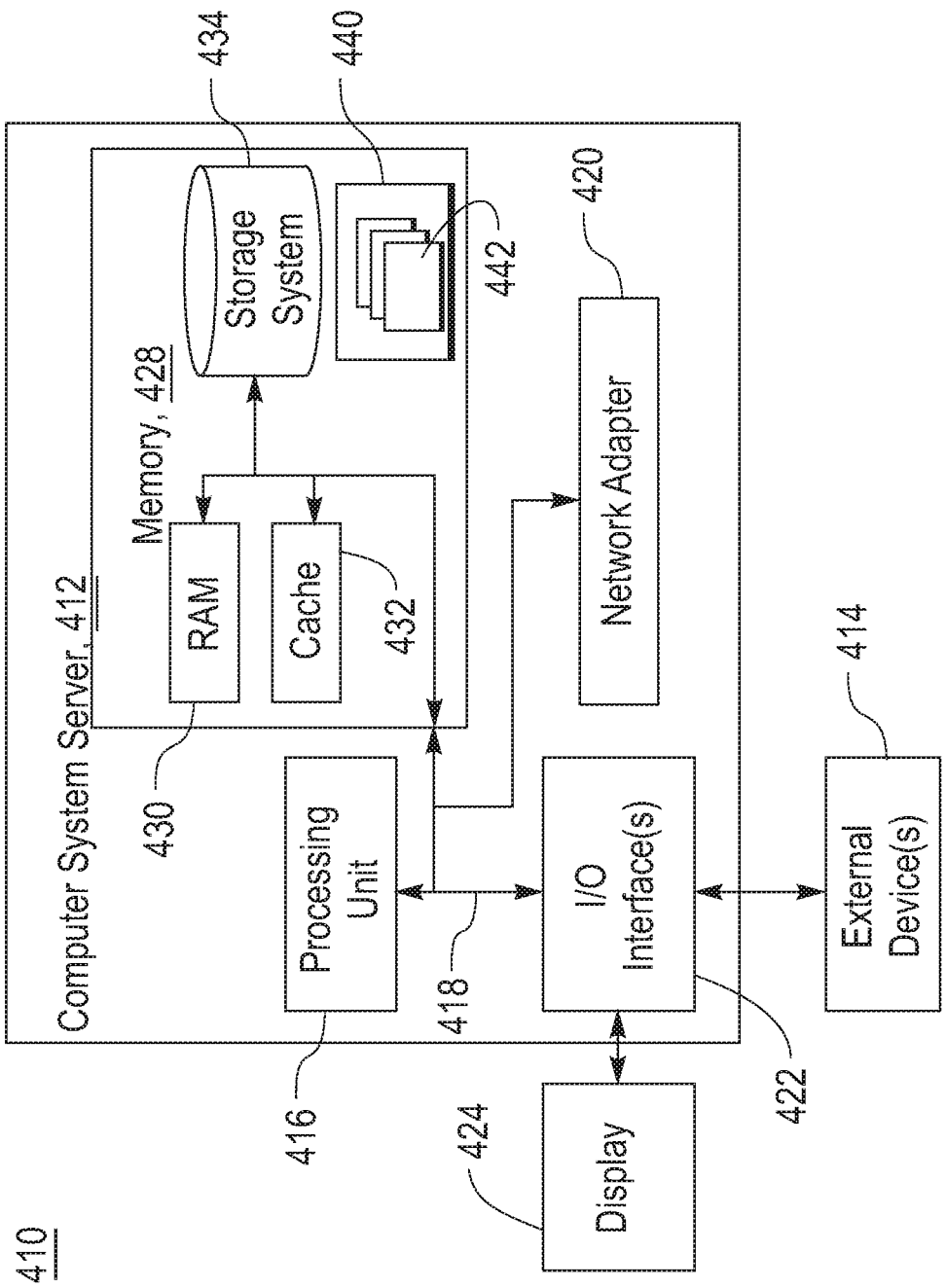
FIG. 4 is a diagram of an exemplary cloud computing node in accordance with an embodiment of the present invention.

Referring now to FIG. 4, a schematic of an example of a cloud computing node 410 is shown. Cloud computing node 410 is only one example of a suitable cloud computing node and is not intended to suggest any limitation as to the scope of use or functionality of embodiments of the invention described herein. Regardless, cloud computing node 410 is capable of being implemented and/or performing any of the functionality set forth hereinabove.

In cloud computing node 410 there is a computer system/server 412, which is operational with numerous other general purpose or special purpose computing system environments or configurations. Examples of well-known computing systems, environments, and/or configurations that may be suitable for use with computer system/server 412 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 412 may be described in the general context of computer system executable instructions, such as program modules, being executed by a computer system. Generally, program modules may include routines, programs, objects, components, logic, data structures, and so on that perform particular tasks or implement particular abstract data types. Computer system/server 512 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 4, computer system/server 412 in cloud computing node 410 is shown in the form of a general-purpose computing device. The components of computer system/server 412 may include, but are not limited to, one or more processors or processing units 416, a system memory 428, and a bus 418 that couples various system components including system memory 428 to processor 416.

Bus 418 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 412 typically includes a variety of computer system readable media. Such media may be any available media that is accessible by computer system/server 412, and it includes both volatile and non-volatile media, removable and non-removable media.

System memory 428 can include computer system readable media in the form of volatile memory, such as random access memory (RAM) 430 and/or cache memory 432. Computer system/server 412 may further include other removable/non-removable, volatile/non-volatile computer system storage media. By way of example only, storage system 434 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 418 by one or more data media interfaces. As will be further depicted and described below, memory 428 may include at least one program product having a set (e.g., at least one) of program modules that are configured to carry out the functions of embodiments of the invention.

Program/utility 440, having a set (at least one) of program modules 442, may be stored in memory 428 by way of example, and not limitation, as well as an operating system, one or more application programs, other program modules, and program data. Each of the operating system, one or more application programs, other program modules, and program data or some combination thereof, may include an implementation of a networking environment. Program modules 442 generally carry out the functions and/or methodologies of embodiments of the invention as described herein.

Computer system/server 412 may also communicate with one or more external devices 414 such as a keyboard, a pointing device, a display 424, etc.; one or more devices that enable a user to interact with computer system/server 412; and/or any devices (e.g., network card, modem, etc.) that enable computer system/server 412 to communicate with one or more other computing devices. Such communication can occur via Input/Output (I/O) interfaces 422. Still yet, computer system/server 412 can communicate with one or more networks such as a local area network (LAN), a general wide area network (WAN), and/or a public network (e.g., the Internet) via network adapter 420. As depicted, network adapter 420 communicates with the other components of computer system/server 412 via bus 418. It should be understood that although not shown, other hardware and/or software components could be used in conjunction with computer system/server 412. Examples, include, but are not limited to: microcode, device drivers, redundant processing units, external disk drive arrays, RAID systems, tape drives, and data archival storage systems, etc.

Figure 5:
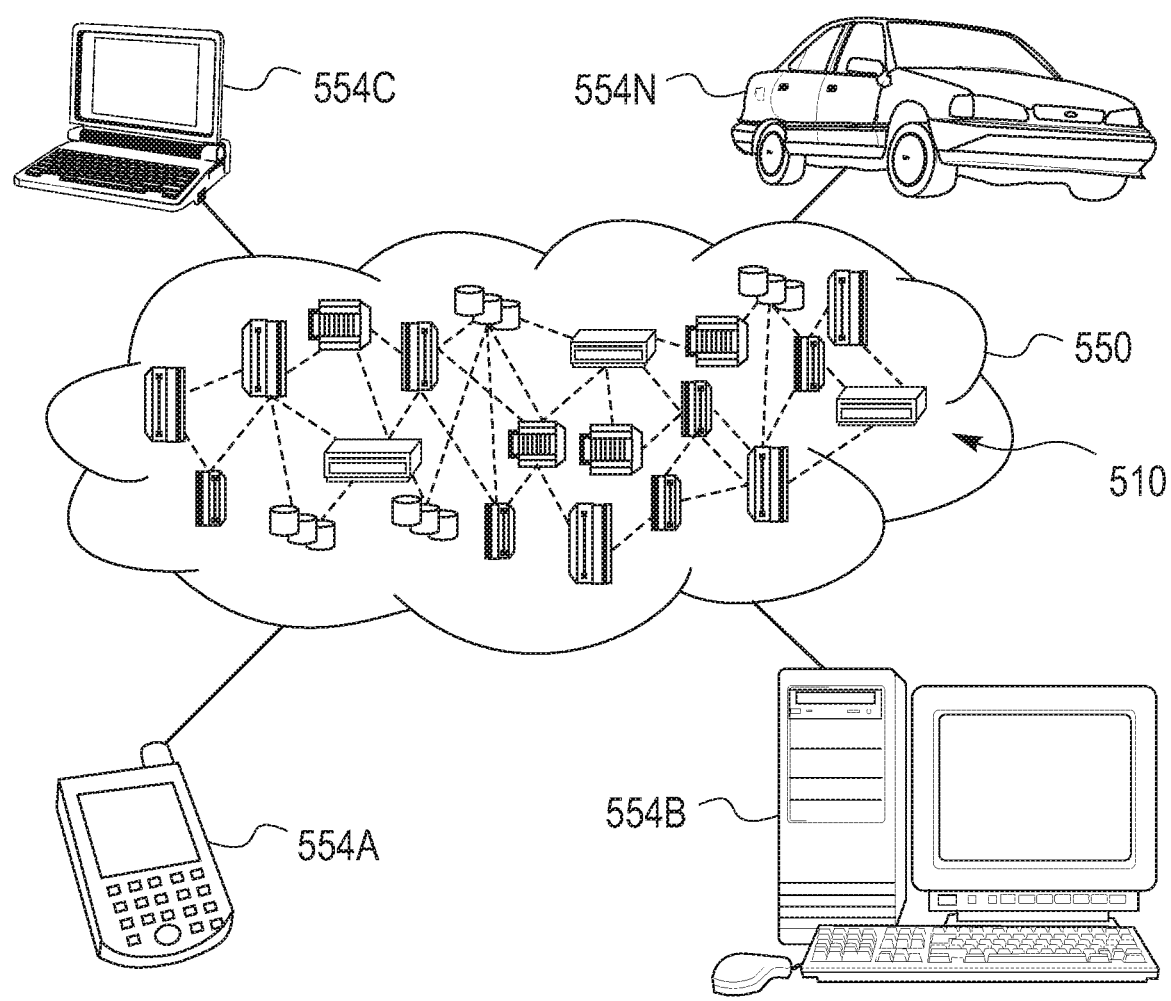
FIG. 5 is a diagram of an exemplary cloud computing environment in accordance with an embodiment of the present invention.

Referring now to FIG. 5, illustrative cloud computing environment 550 is depicted. As shown, cloud computing environment 650 includes one or more cloud computing nodes 510 with which local computing devices used by cloud consumers, such as, for example, personal digital assistant (PDA) or cellular telephone 554A, desktop computer 554B, laptop computer 554C, and/or automobile computer system 554N may communicate. Nodes 510 may communicate with one another. They may be grouped (not shown) physically or virtually, in one or more networks, such as Private, Community, Public, or Hybrid clouds as described hereinabove, or a combination thereof. This allows cloud computing environment 550 to offer infrastructure, platforms and/or software as services for which a cloud consumer does not need to maintain resources on a local computing device. It is understood that the types of computing devices 554A-N shown in FIG. 5 are intended to be illustrative only and that computing nodes 510 and cloud computing environment 550 can communicate with any type of computerized device over any type of network and/or network addressable connection (e.g., using a web browser).

Figure 6:
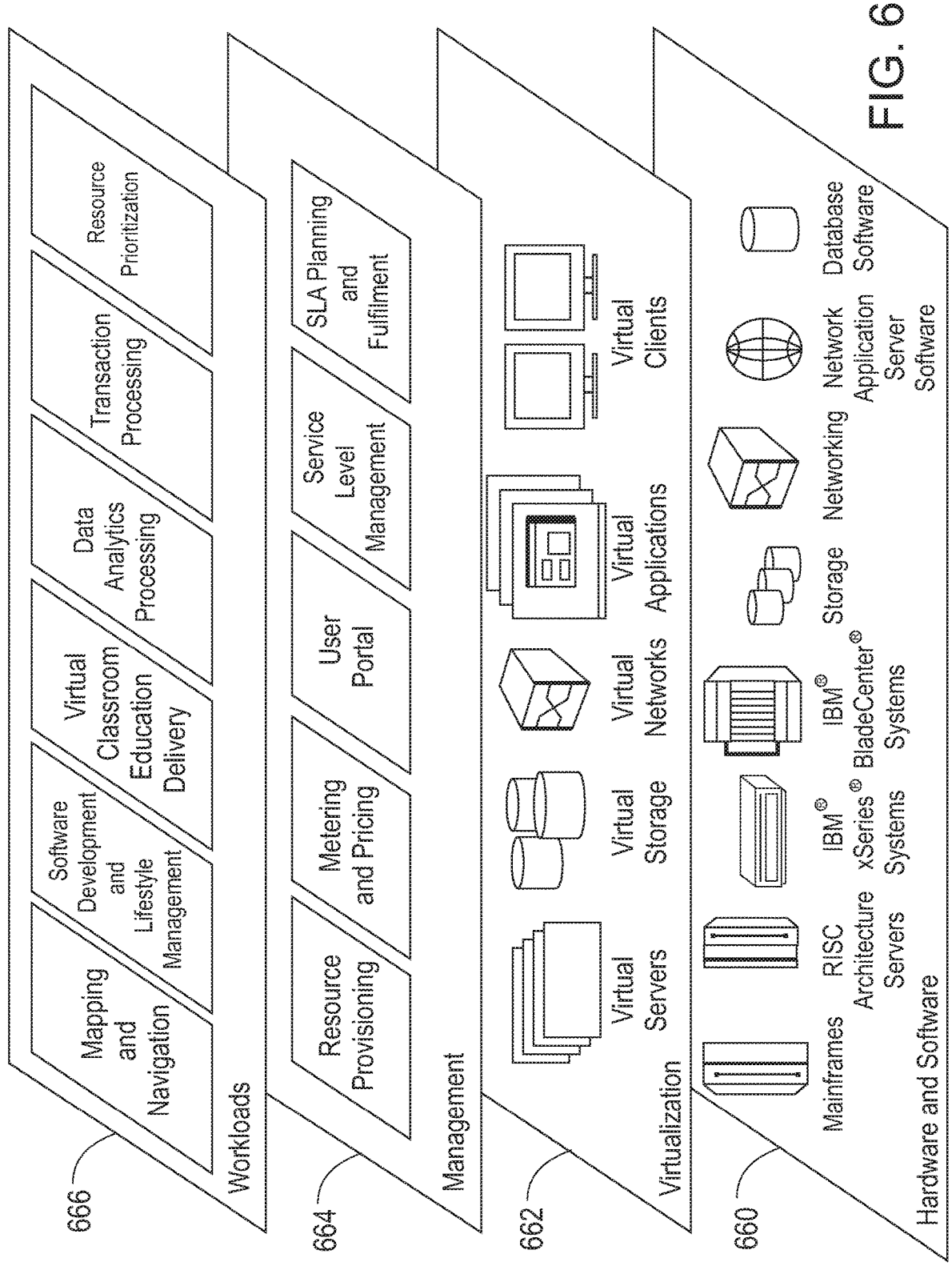
FIG. 6 is a schematic diagram of exemplary abstraction model layers in accordance with an embodiment of the present invention.

Referring now to FIG. 6, a set of functional abstraction layers provided by cloud computing environment 550 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 660 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 662 provides an abstraction layer from which the following examples of virtual entities may be provided: virtual servers; virtual storage; virtual networks, including virtual private networks; virtual applications and operating systems; and virtual clients.

In one example, management layer 664 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 666 provides examples of functionality for which the cloud computing environment may be utilized. Examples of workloads and functions which may be provided from this layer include: mapping and navigation; software development and lifecycle management; virtual classroom education delivery; data analytics processing; transaction processing; and resource prioritization.

Having described preferred embodiments of a system and method for controlling process priority (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

The invention claimed is:

1. A method for controlling process priority for one or more work units having one or more processes, the method comprising:
    detecting a change in load level for each work unit based on a correlation between a monitored throughput value and a monitored response time value of the work units to adjust a priority level associated with each work unit;
    maintaining the priority level associated with the work units when one of the throughput value and the response time value changes; and
    reallocating one or more resources to the work unit when the priority level exceeds a predetermined threshold value.

2. The method of claim 1, wherein the work unit is a container having at least one application, the at least one application including at least one process.

3. The method of claim 1, wherein the work unit is a virtual machine, the virtual machine including at least one process.

4. The method of claim 1, further comprising increasing the priority level associated with the work unit when the throughput value and the response time value are increased such that swappiness of memory is decreased for the work unit.

5. The method of claim 1, further comprising decreasing the priority level associated with the work unit when the throughput value and the response time value are decreased such that swappiness of memory is increased for the work unit.

6. The method of claim 1, wherein maintaining the priority level associated with the work unit occurs when one of the throughput value and the response time value is increased.

7. The method of claim 1, wherein maintaining the priority level associated with the work unit occurs when one of the throughput value and the response time value is decreased.

8. The method of claim 1, further comprising inversely relating a frequency of resource swapping with the priority level associated with the work unit.

9. A non-transitory computer readable storage medium comprising a computer readable program for controlling process priority for one or more work units having one or more processes, wherein the computer readable program when executed on a computer causes the computer to execute:
    detecting a change in load level for each work unit based on a correlation between a monitored throughput value and a monitored response time value of the work units to adjust a priority level associated with the work units;
    maintaining the priority level associated with the work unit when one of the throughput value and the response time value changes; and
    reallocating one or more resources to the work unit when the priority level exceeds a predetermined threshold value.

10. The non-transitory computer readable storage medium of claim 9, wherein the work unit is a container having at least one application, the at least one application including at least one process.

11. The non-transitory computer readable storage medium of claim 9, wherein the work unit is a virtual machine, the virtual machine including a plurality of processes.

12. The non-transitory computer readable storage medium of claim 9, further comprising increasing the priority level associated with the work unit when the throughput value and the response time value are increased such that swappiness of the memory is decreased for the work unit.

13. The non-transitory computer readable storage medium of claim 9, further comprising decreasing the priority level associated with the work unit when the throughput value and the response time value are decreased such that swappiness of memory is increased for the work unit.

14. The non-transitory computer readable storage medium of claim 9, wherein maintaining the priority level associated with the work unit occurs when one of the throughput value and the response time value is increased.

15. The non-transitory computer readable storage medium of claim 9, wherein maintaining the priority level associated with the work unit occurs when one of the throughput value and the response time value is decreased.

16. The non-transitory computer medium of claim 9, further comprising inversely relating a frequency of resource swapping with the priority level associated with the work unit.

17. A system, comprising:
a memory; and
a hardware processor configured to:
detect a change in load level for each work unit based on a correlation between a monitored throughput value and a monitored response time value of the each work unit to adjust a priority level associated with the work unit;
maintain the priority level associated with the work unit when one of the throughput value and the response time value changes; and
reallocate one or more resources to the work unit when the priority level exceeds a predetermined threshold value.

18. The system of claim 17, wherein the hardware processor is further configured to increase the priority level associated with the work unit when the throughput value and the response time value are increased such that swappiness of memory is decreased for the work unit.

19. The system of claim 17, wherein the hardware processor is further configured to decrease the priority level associated with the work unit when the throughput value and the response time value are decreased such that swappiness of memory is increased for the work unit.

20. The system of claim 17, wherein the hardware processor is further configured to inversely relate a frequency of resource swapping with the priority level associated with the work unit.

* * * * *